United States Patent [19]
Kuffel et al.

[11] Patent Number: 5,332,179
[45] Date of Patent: Jul. 26, 1994

[54] 2-WAY BOX MOUNT

[75] Inventors: Gregory L. Kuffel, Shaumburg; Joseph S. Follenweider, Tinley Park, both of Ill.

[73] Assignee: Panduit Corp., Tinley Park, Ill.

[21] Appl. No.: 998,694

[22] Filed: Dec. 30, 1992

[51] Int. Cl.⁵ ............................................. F16L 3/08
[52] U.S. Cl. .................................. 248/743; 24/16 R; 248/68.1
[58] Field of Search .............. 248/65, 74.1, 74.2, 248/74.3, 71, 73, 68.1; 24/16 R, 455, 458

[56] References Cited

U.S. PATENT DOCUMENTS

| | | | |
|---|---|---|---|
| 3,087,700 | 4/1963 | Carpenter et al. | 248/74.3 |
| 3,454,249 | 7/1969 | Geisinger . | |
| 3,544,053 | 12/1970 | Ingalls | 248/903 X |
| 3,632,069 | 9/1972 | Thayer et al. | 248/68.1 X |
| 3,632,071 | 1/1972 | Cameron et al. | 248/74.3 |
| 4,379,537 | 4/1983 | Perrault et al. | 248/74.3 |
| 4,397,436 | 8/1983 | Lyon et al. | 248/68.1 |
| 4,562,982 | 1/1986 | McSherry et al. | 248/68.1 X |
| 4,766,651 | 8/1988 | Kobayashi et al. | 248/74.3 X |
| 5,103,534 | 4/1992 | Caveney | 24/16 R X |

*Primary Examiner*—Ramon O. Ramirez
*Attorney, Agent, or Firm*—Charles R. Wentzel; Mark D. Hilliard; Robert A. McCann

[57] ABSTRACT

A box mount for securing a bundle of wires by a metal cable tie to a mounting surface being integrally formed and having rounded surfaces that cooperate with and contact the cable tie. Integral support tabs are also provided to give added strength to the mount in the direction that the cable tie strap is tightened.

14 Claims, 2 Drawing Sheets

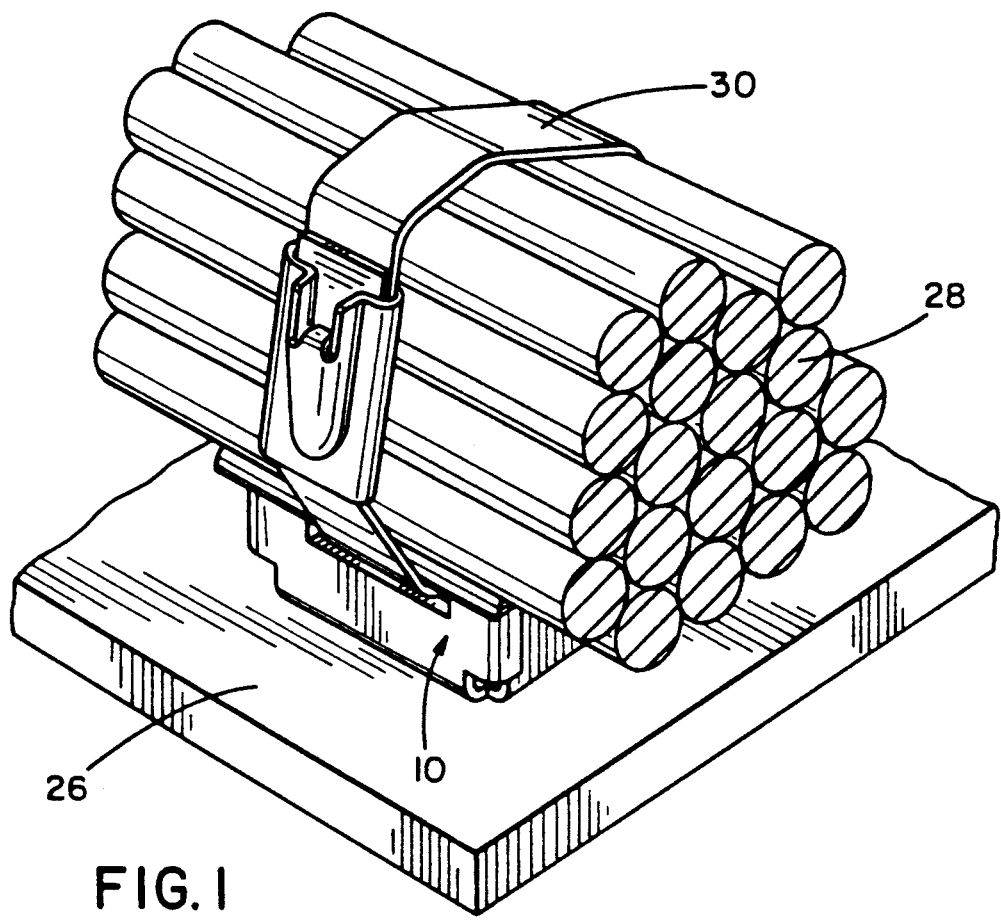
FIG. 1
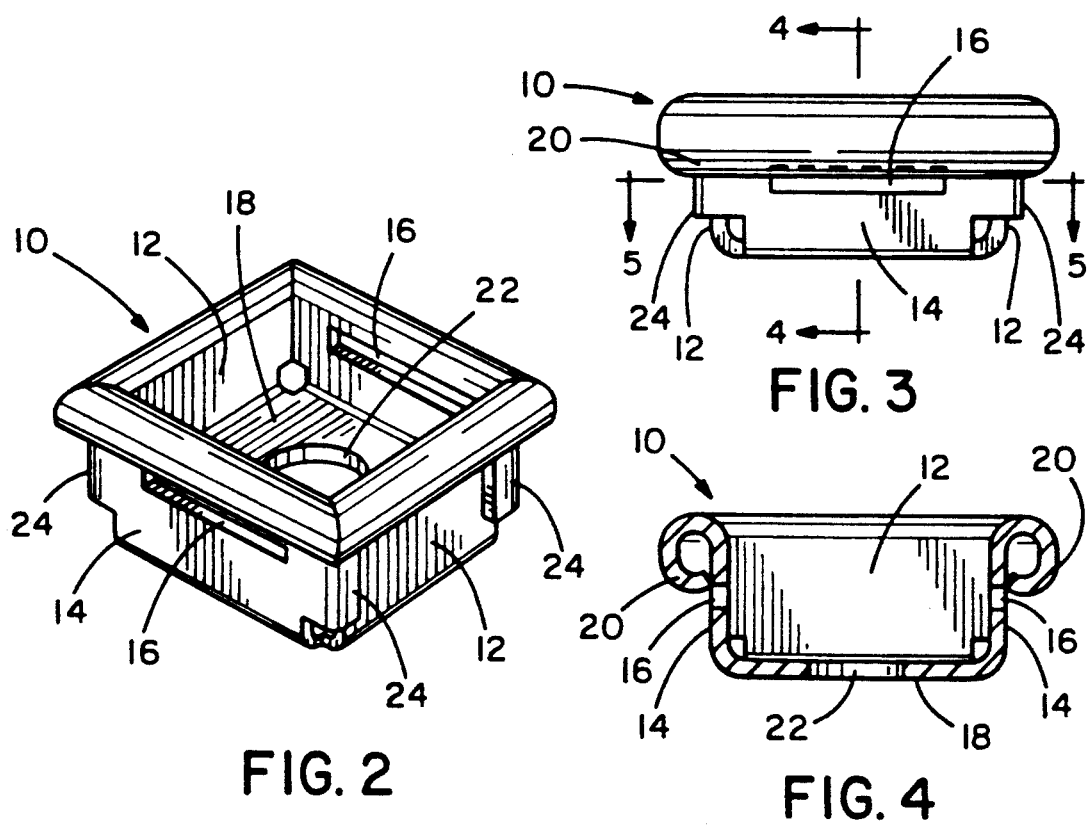
FIG. 2
FIG. 3
FIG. 4

2-WAY BOX MOUNT

TECHNICAL FIELD

The present invention relates to a mount for mounting bundle of wires that are secured by a cable tie to a mounting surface, and more specifically to a box-shaped mount which provides rounded surfaces for contacting a metal cable tie used to secure the bundle to a mounting surface.

BACKGROUND OF THE INVENTION

The following examples of mounts are known in the prior art; U.S. Pat. No. 3,087,700 to Carpenter et al., U.S. Pat. No. 3,454,249 to Geisenger and U.S. Pat. No. 4,397,436 to Lyon et al.

In the electrical industry today there is an increasing number of applications in which use of a metal cable tie rather than a plastic one is highly desirable. One disadvantage of many of the prior mounts is that they have sharp surfaces that are in contact with the metal cable tie strap. These sharp surfaces cause bends and cuts to form in the metal straps that often result in the strap breaking under stress.

In addition, many of the prior mounts are limited by their lack of strength, particularly in the direction that the cable tie is to be applied. With the increased utilization of metal cable ties, there is an increased demand to provide mounts that are strong enough to withstand the great stresses to which these mounts are subjected. In particular, it is important that the mount not collapse under the stresses resulting from the tightening of the cable tie around the bundle and the mount.

SUMMARY OF THE INVENTION

It is therefore an object of the present invention to provide an improved mount for mounting bundles to a mounting surface.

It is also an object of the present invention to provide a mount that can properly be used to mount bundles secured by a metal cable tie to a mounting surface.

It is another object of the present invention to provide a mount that does not have sharp edges that would create bends and cuts in a metal cable tie engaged therewith.

In general, the foregoing objects are attained by providing a box mount including an integrally formed mount member having a floor and at least two opposing side walls include slots for permitting a cable tie strap to be inserted, and reversely bent extended portions of the side walls integrally formed as rolled top portions.

BRIEF DESCRIPTION OF THE DRAWINGS

FIG. 1 is a perspective view of a mount embodying the concept of the present invention shown securing a bundle of wires to a mounting surface;

FIG. 2 is a perspective view of the mount of FIG. 1;

FIG. 3 is a side view of the mount of FIG. 1;

FIG. 4 is a sectional view of the mount of FIG. 1 1 taken along line 4—4 of FIG. 3;

DESCRIPTION OF THE PREFERRED EMBODIMENT

Figure 5:
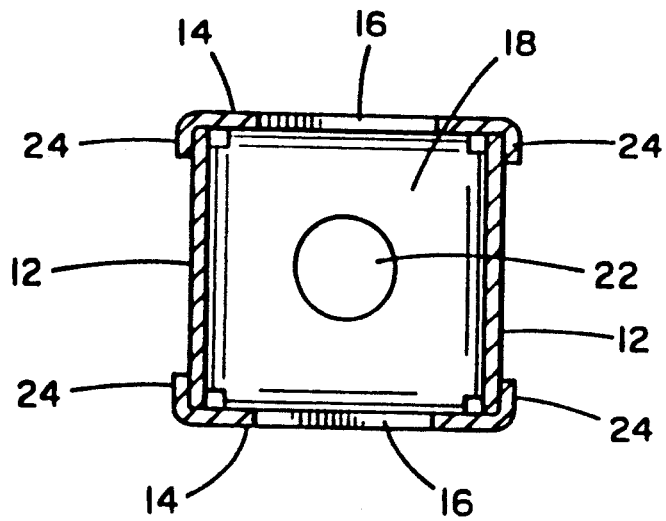
FIG. 5 is a sectional plan view of the mount of FIG. taken along line 5—5 of FIG. 3.

A box mount embodying the concept of the present invention is designated generally by the reference numeral 10 in the accompanying drawings. Mount 10 is formed from sheet metal stamping of a unitary piece of metal such as stainless steel. As shown in FIG. 2, mount 10 is generally box-shaped and includes a floor portion 18 and four integrally formed perpendicular walls. The four walls consist of a pair of opposing end walls 12 and a pair of opposing side walls 14. The ends of end walls 12 abut opposing side walls 14 to give support against collapse of mount member 10 in the direction parallel to an engaged cable tie 30. Side walls 14 have rectangular slots 16 cut therein which provide openings for the strap of cable tie 30 to be fed through as shown in FIG. 6.

Both the end walls 12 and the side walls 14 are further provided with rolled top portions 20. As can be seen in FIG. 4, rolled top portions 20 are integral extensions of the side walls 14 and end walls 12 respectively. They are formed by bending back the extended wall sections away from the opposing walls until they come back around upon the walls in such a manner so as to create a curved tubular surface at the top of each wall. The rolled top portions 20 that are integral with the opposing side walls 14, extend to a point slightly below the top of the opening of slots 16 as can be seen in FIGS. 3 and 4. This creates a curved surface which will abut the cable tie 30 as it is fed through slot 16 and also prevent the cable tie from contacting any sharp edges of slots 16.

The floor 18, as shown in FIG. 5, which is disposed at the bottom of and integral with all four walls, includes means such as a screw hole 22 for securing the mount 10 so that mount 10 can be secured to a mounting surface 26.

Figure 6:
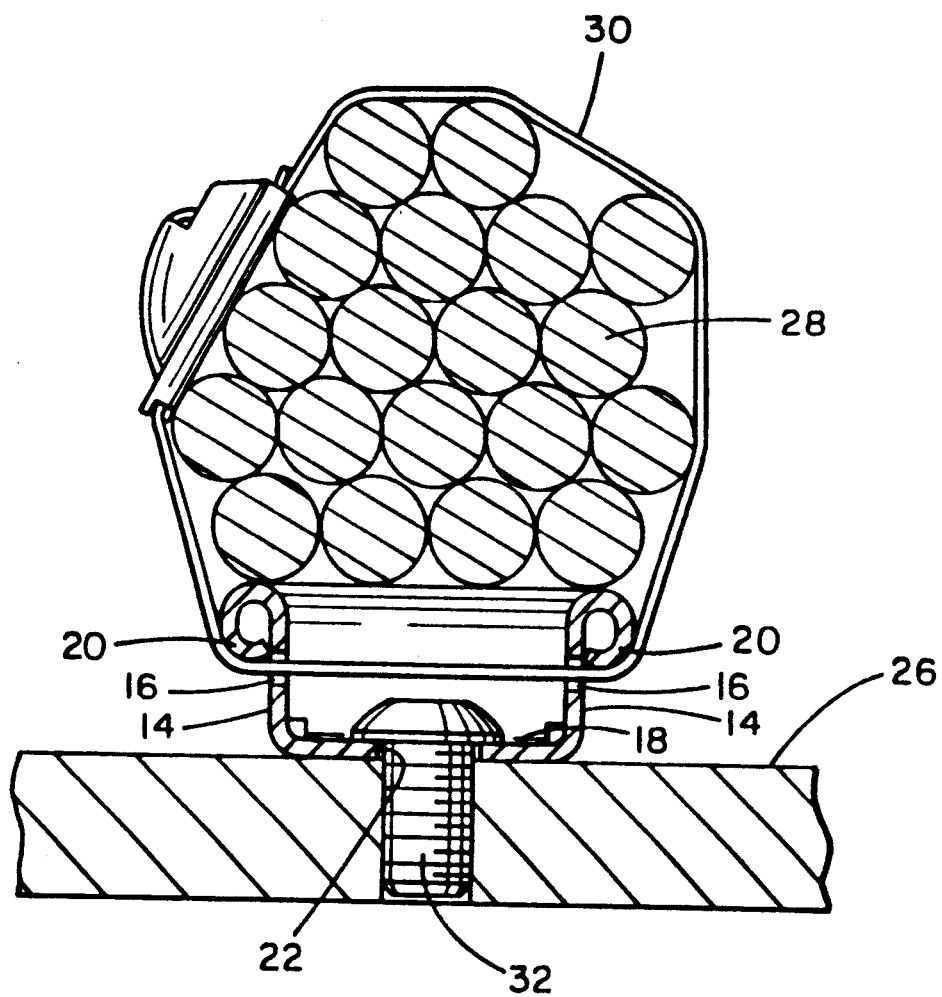
FIG. 6 is a sectional side view of the mount of FIG. 1.

As best seen in FIG. 6, a cable tie 30 is inserted through slots 16 in side walls 14 and is fastened around a bundle of wires 28. As a result of the rolled top portions 20 extending slightly below the top of the slot opening, the cable tie is maintained in contact with only rounded surfaces of the mount 10. Rolled top portions 20, formed on all of the walls, also provide rounded surfaces for the bundle 28 to rest against. It can also be seen in FIG. 6 that mount 10 is attached to a mounting surface 26 by inserting a screw 32 through screw hole 22 formed in floor 18 and securing it to mounting surface 26.

As seen in FIG. 4, side walls 14 also include extension tabs 24 that are folded over the adjacent end walls 12 to strengthen box mount 10 against collapse. As a cable tie 30 is engaged with mount 10 and tightened around a bundle 28, the strengthening tabs 24 help prevent collapse of the mount by securing the abutting side ends of end walls 12.

While the particular embodiment of the present invention has been shown and described. It will be obvious to those skilled in the art that changes and modifications may be made without departing from the invention in its broader aspects. The matter set forth in the foregoing description and accompanying drawings is offered by way of illustration only and not as a limitation. The actual scope of the invention is intended to be defined in the following claims when viewed in their proper perspective based on the prior art.

We claim:

1. A box mount comprising:

an integrally formed mount member having a floor and at least two opposing side walls including slots for permitting a cable tie strap to be inserted, and reversely bent extended portions of the side walls integrally formed as rolled top portions.

2. A box mount in accordance with claim 1, wherein the rolled top portions extend slightly below the top of the slot opening.

3. A box mount in accordance with claim 2, further comprising means for strengthening the mount member in a direction parallel to the cable tie strap.

4. A box mount in accordance with claim 3, wherein the means for strengthening the mount member in a direction parallel to the cable tie strap is a pair of opposing end walls integral with the floor and disposed so as to be in between and abutting the opposing side walls.

5. A box mount in accordance with claim 4, wherein side walls include tab portions extending from the ends of the side walls folded over in a direction such that they are disposed along the outer surface of the end walls.

6. A box mount comprising:
a mount member having a floor that includes mounting means for securing the mount member to a mounting surface;
a pair of opposing side walls formed perpendicular to the floor, each of the side walls having a slot;
rolled top portions formed as reversely bent extended portions of the side walls integral with the side walls; and
support means disposed between the side walls for preventing collapse of the side walls.

7. A box mount in accordance with claim 6, wherein the roll top portions are formed as rounded tubular sections.

8. A box mount in accordance with claim 7, wherein the rolled top portions of the side walls extend slightly below the top of an opening in the slots.

9. A box mount in accordance with claim 8, wherein the rolled top portions are formed so as to provide rounded surfaces of the mount member for contacting a cable tie strap.

10. A box mount in accordance with claim 9, wherein the support means is a pair of opposing end walls each adjacent to and abutting the side walls and formed perpendicular to the floor.

11. A box mount in accordance with claim 10, wherein the pair of end walls further include rolled top portions.

12. A box mount in accordance with claim 11, wherein the mounting means is a screw hole centrally located on the floor.

13. A box mount in accordance with claim 12, wherein the side walls further include tab portions that fold around the end walls for strengthening the structure of the mount.

14. A box mount in accordance with claim 13, wherein the mount member is unitarily formed.

* * * * *